(12) United States Patent
Tamura

(10) Patent No.: US 8,365,890 B2
(45) Date of Patent: Feb. 5, 2013

(54) ONE WAY CLUTCH AND STATOR ASSEMBLY INCLUDING ONE WAY CLUTCH

(75) Inventor: Nariaki Tamura, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 13/090,238

(22) Filed: Apr. 19, 2011

(65) Prior Publication Data

US 2011/0253497 A1    Oct. 20, 2011

(30) Foreign Application Priority Data

Apr. 20, 2010    (JP) .................. 2010-097186

(51) Int. Cl.
*F16D 41/066*    (2006.01)

(52) U.S. Cl. ............. 192/45.019; 192/45.02; 192/110 B

(58) Field of Classification Search ............. 192/45.018, 192/45.019, 45.02; 60/345
See application file for complete search history.

(56) References Cited

U.S. PATENT DOCUMENTS

| 3,087,589 A | * | 4/1963 | Gorsky | 192/45.019 |
| 4,953,353 A | * | 9/1990 | Lederman | 60/345 |

FOREIGN PATENT DOCUMENTS

| JP | 2009-299860 A | 12/2009 |
| JP | 2009-299862 A | 12/2009 |

* cited by examiner

*Primary Examiner* — Richard M. Lorence
(74) *Attorney, Agent, or Firm* — Miles and Stockbridge P.C.

(57) ABSTRACT

A one way clutch comprises an outer race including pockets having a cam surface and projecting portions disposed inwardly in a radial direction and extending toward an inner race; the inner race disposed away from the outer race in an inner diameter direction, relatively rotatably disposed concentrically with the outer race, and having an outer peripheral surface; torque transmission members arranged in the pockets to transmit a torque between the cam surface of the outer race and the outer peripheral surface of the inner race; springs for urging the torque transmission members in such a direction that the torque transmission members mesh with the cam surface of the outer race; and bearing members arranged between the outer race and the inner race and interposed between the projecting portions of the outer race and the outer peripheral surface, of the inner race.

6 Claims, 2 Drawing Sheets

ONE WAY CLUTCH AND STATOR ASSEMBLY INCLUDING ONE WAY CLUTCH

BACKGROUND OF THE INVENTION

1. Field of the Invention

The present invention relates to a one way clutch for use as a backstop part in a torque converter of vehicles such as automobiles or the like, and more particularly, it relates to a one way clutch having a bearing function. The present invention also relates to a stator assembly including such a one way clutch.

2. Description of the Related Art

In general, a one way clutch is used to transmit or interrupt a power along a single direction in a power transmission mechanism of an automobile or the like. Some of such one way clutches are used in a stator of a torque converter. As to this one way clutch, an outer ring of the one way clutch is pressed or key-fitted into a stator wheel, whereby the one way clutch is disposed integrally in the stator. On opposite sides of the one way clutch, bearings which receive a radial load are arranged in many cases. Such an example is disclosed in, for example, Japanese Patent Application Laid-Open No. 2009-299862 and Japanese Patent Application Laid-Open No. 2009-299860.

FIG. 4 is an axial sectional view of a one way clutch 130 schematically showing the above conventional technology. The one way clutch 130 comprising an outer race 110 disposed integrally in a stator wheel 190 of a torque converter and an inner race 120 includes a clutch portion 180 interposed between the outer and inner races and having a sprag.

On the opposite sides of the one way clutch 130 in an axial direction, there are arranged two bearings 140 and 150 which receive the radial load. The bearings 140 and 150 are supported by thrust bearings 160. In consequence, a total width W3 of a stator assembly 200 containing the one way clutch 130 in the axial direction becomes large.

However, in the conventional one way clutch typically disclosed in Japanese Patent Application Laid-Open No. 2009-299862 and Japanese Patent Application Laid-Open No. 2009-299860 as described above, the bearings at opposite ends in the axial direction are supported by aluminum bushes, the thrust bearings or the like, and hence the axial length of the stator assembly 200 cannot be shortened.

In recent years, miniaturization and lightening of devices mounted on a vehicle have strictly been required, and there have further been demanded the shortening of the axial length (the total width) of the stator assembly including the one way clutch or the lightening by simplification of peripheral parts. However, the conventional one way clutch cannot always satisfy the demand.

SUMMARY OF THE INVENTION

Therefore, an object of the present invention is to provide a one way clutch having a shortened total width in an axial direction and including simplified peripheral parts, and a stator assembly including a one way clutch.

To achieve the above object, a one way clutch of the present invention is characterized by comprising:

an outer race including pockets having a cam surface and projecting portions disposed inwardly in a radial direction and extending toward an inner race;

the inner race disposed away from the outer race in an inner diameter direction, relatively rotatably disposed concentrically with the outer race, and having an outer peripheral surface;

torque transmission members arranged in the pockets to transmit a torque between the cam surface of the outer race and the outer peripheral surface of the inner race;

springs for urging the torque transmission members in such a direction that the torque transmission members mesh with the cam surface of the outer race; and bearing members arranged between the outer race and the inner race and interposed between the projecting portions of the outer race and the outer peripheral surface of the inner race.

According to the present invention, an effect is obtained as follows.

The axial length (the total width) of a stator assembly can be shortened, and the stator assembly can be lightened by simplifying peripheral parts. Therefore, there can be provided a compact one way clutch including a saved space and having an excellent cost performance.

Moreover, a bearing function is included over the total width of the one way clutch, and hence it is possible to eliminate radial bearings arranged on opposite sides of the stator assembly in an axial direction. Therefore, the axial length of the one way clutch can be shortened.

Further features of the present invention will become apparent from the following description of exemplary embodiments with reference to the attached drawings.

DESCRIPTION OF THE EMBODIMENTS

Figure 1:
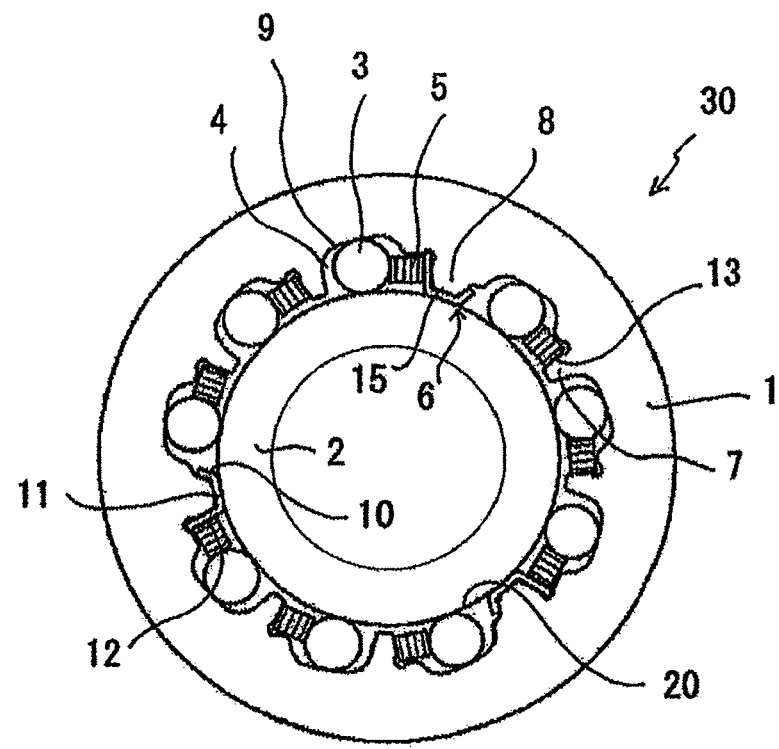
FIG. 1 is a front view of a one way clutch showing one example of the present invention.

Preferred embodiments of the present invention will now be described in detail in accordance with the accompanying drawings.

A term "torque transmission member" for use in the present invention is a member which engages (meshes) with a cam surface formed in pockets of an outer race and the outer peripheral surface of an inner race to transmit a torque. There is not any special restriction on a shape of the member as long as the member can engage with the cam surface. Examples of the shape of the torque transmission member include various types of configurations such as a roller, a spherical member and a spherical sprag.

Hereinafter, the present invention will be described in detail with reference to the drawings. It is to be noted that needless to say, embodiments described hereinafter illustrate the present invention, and do not limit the present invention. Moreover, the same parts in the drawings are denoted with the same reference numerals.

FIG. 1 is a front view of a one way clutch showing an example of the present invention. As shown in FIG. 1, a one way clutch 30 for use in a torque converter (not shown) includes an outer race 1 pressed or key-fitted into a stator wheel 50 (see FIG. 2 and FIG. 3) of the torque converter and fixed integrally to the wheel, and an inner race 2 disposed away from the outer race 1 in an inner diameter direction, relatively rotatably disposed concentrically with the outer race, and having an outer peripheral surface 20. On an inner diameter side of the outer race 1, a plurality of pockets 4 having a cam surface 9 are arranged at equal intervals in a peripheral or circumferential direction.

In the pockets 4, rollers 3 which are torque transmission members are arranged. The substantially cylindrical rollers 3 engage (mesh) with the cam surface 9 of the outer race 1 and the outer peripheral surface 20 of the inner race 2, to transmit a torque. In the pockets 4, springs 5 are arranged to urge the rollers 3 in a direction in which the rollers mesh with the cam surface 9 of the outer race.

Each of the springs 5 is an accordion spring, but another spring such as a coil spring may be used.

Inwardly in a radial direction of the outer race 1, two types of projecting portions extending toward the inner race 2 are arranged. A plurality of projecting portions are arranged at equal intervals in a peripheral direction, and include first projecting portions 7 which hold the springs 5, and second projecting portions 8 which hold the springs 5 from sides and to which bearing members 6 are attached, and the first projecting portions 7 and the second projecting portions 8 are arranged alternately in the peripheral direction. As seen from FIG. 1, two first projecting portions 7 are arranged side by side in the peripheral direction, and the second projecting portions 8 are arranged adjacent to the first projecting portions on both sides. In the present embodiment, three second projecting portions 8 are arranged in the peripheral direction, and two first projecting portions 7 disposed adjacent to each other are interposed between the second projecting portions 8.

The springs 5 are seated on side surfaces 13 of the first projecting portions 7 in the peripheral direction, and held thereon. Moreover, the second projecting portions 8 are provided with the bearing members 6. The bearing members 6 are sandwiched so as to cover the second projecting portions 8. Each of the bearing members 6 includes a bottom surface 11 having a bearing function, and side portions 10 and 12 extending from both sides of the bottom surface 11 in the peripheral direction, whereby the bearing member is integrally formed. Moreover, there is a predetermined clearance between the tip of each of the first projecting portions 7 facing the outer peripheral surface 20 of the inner race 2 and the outer peripheral surface 20, and hence the tips of the first projecting portions do not come in contact with the outer peripheral surface of the inner race 2. Therefore, the three bearing members 6 perform a function of bearing the inner race 2 and the outer race 1.

The bottom surface 11 abuts on a tip 15 of each of the second projecting portions 8. The side portions 10 and 12 surround the second projecting portion 8, and the bearing members are interposed between the outer race 1 and the inner race 2 so as to entirely cover the second projecting portions 8. The side portion 12 has a larger length than the side portion 10, and has a function of a bearing surface which holds the end of the spring 5.

As seen from FIG. 1, the first projecting portion 7 has a predetermined space from the outer peripheral surface 20 of the inner race 2, and does not come in contact with the inner race 2. On the other hand, a space between the second projecting portion 8 and the inner race 2 is set to be slightly larger than a thickness of the bottom surface 11 of the bearing members 6.

The bearing member 6 is not fixed to the second projecting portion 8 of the outer race 1 but sandwiches the second projecting portion 8 between the two side portions 10 and 12 thereof, whereby a constitution can be simplified. The three bearing members 6 are disposed in the peripheral direction, but the number of the bearing members is arbitrary, and can be changed if necessary.

When the one way clutch 30 operates, the bottom surfaces 11 of the bearing members 6 have the bearing function with respect to the inner race 2, but have the same degree of torque capacity as a conventional bearing. The bearing members 6 are integrally formed by a method of attaching a coating material having functionality thereto or with a pressed steel plate or a sintering material. When the bearing members are supported by the second projecting portions 8 of the outer race 1, rigidity of bearings is acquired, and sliding portions of the bearing members with respect to the inner race 2 can be provided with a slide bearing function.

The bearing members 6 can be fitted into the second projecting portions 8 in a snap fitting manner. Furthermore, the bearing members as members having a self-sustainable constitution can be attached to the three second projecting portions 8, but the bearing members may be integrally formed by ring-like bonding members, respectively.

In addition to the above example, when the coating material having the functionality is attached to the second projecting portion 8 itself, the second projecting portion can be provided with the bearing function. In this case, members can be omitted. Furthermore, when the coating material having the functionality is attached to the bearing surface of the bearing member 6, a bearing performance can be improved.

First Embodiment

Figure 2:
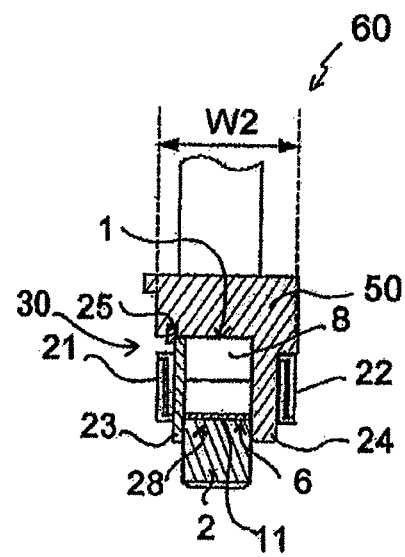
FIG. 2 is an axially partially sectional view showing a one way clutch indicating a first embodiment of the present invention.

FIG. 2 is an axially partially sectional view showing a one way clutch according to a first embodiment of the present invention. An outer race 1 integrally fixed to a stator wheel 50 includes, as one end portion in an axial direction, a ring-like flange portion 24 extending in a radially inward direction. A side plate 23 is disposed so as to face the flange portion 24 in the axial direction. A clutch portion 28 of a one way clutch 30 is disposed between the flange portion 24 and the ring-like side plate 23. The side plate 23 having a smaller axial thickness than the flange portion 24 has outward movement in the axial direction limited by a stopper ring 25 fixed to the outer race 1, whereby the clutch portion 28 is prevented from dropping down in the axial direction.

Figure 4:
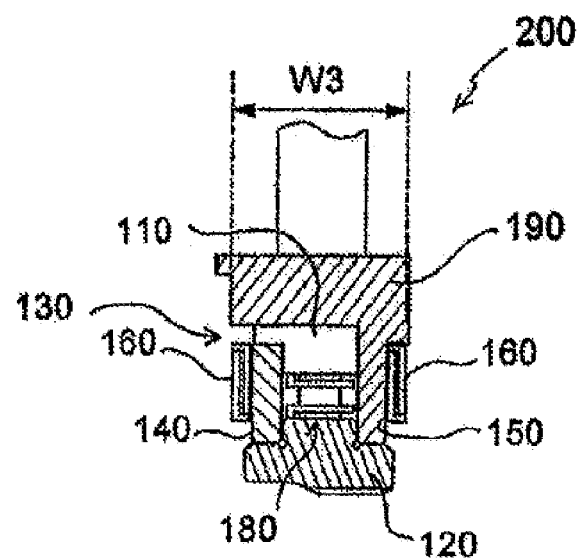
FIG. 4 is an axially partially sectional view of a conventional one way clutch.

Moreover, the side plate 23 is supported by a thrust bearing 21 disposed outwardly in the axial direction, and the flange portion 24 is supported by a thrust bearing 22 disposed outwardly in the axial direction. In FIG. 2, W2 is the total width of a stator assembly 60 including the one way clutch 30 in the axial direction. As compared with a conventional stator assembly 200 shown in FIG. 4, the total width becomes small, because one side of the assembly in the axial direction is supported by the side plate. That is, the total width W2 is smaller than a total width W3. Therefore, the axial length (the total width) of the stator assembly 60 can be shortened, and the whole stator assembly 60 can be lightened by simplifying peripheral parts.

Second Embodiment

Figure 3:
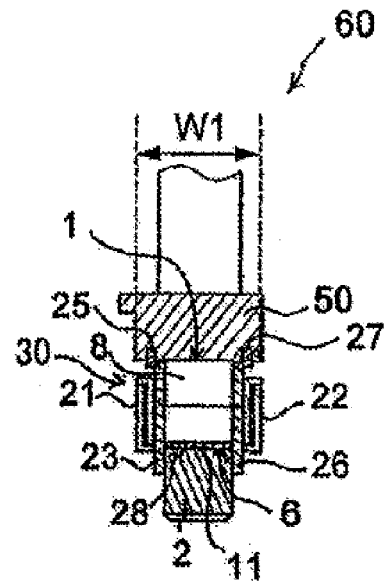
FIG. 3 is an axially partially sectional view showing a one way clutch indicating a second embodiment of the present invention.

FIG. 3 is an axially partially sectional view showing a one way clutch indicating a second embodiment of the present invention. In the second embodiment, an outer race 1 integrally fixed to a stator wheel 50 is not provided with any flange portion, and both sides of a clutch portion 28 of a one way clutch 30 are supported by side plates. A side plate 23 and a side plate 26 support the clutch portion 28 of the one way clutch 30. Each of the ring-like side plates 23 and 26 has a smaller axial thickness than a conventional bearing or the flange portion 24 of FIG. 2. The side plate 23 has outward movement in an axial direction limited by a stopper ring 25 fixed to the outer race 1 in the same manner as in the first embodiment, and the side plate 26 has outward movement in the axial direction limited by a stopper ring 27 fixed to the outer race 1, whereby the side plates 23 and 26 prevent the clutch portion 28 from dropping down in the axial direction.

Moreover, in the same manner as in the first embodiment, the side plate 23 is supported by a thrust bearing 21 disposed outwardly in the axial direction, and the side plate 26 is supported by a thrust bearing 22 disposed outwardly in the axial direction. In FIG. 3, W1 is the total width of a stator assembly 60 including the one way clutch 30 in the axial direction. Since both sides of the stator assembly in the axial direction are supported by the thin side plates, as compared with the conventional stator assembly 200 shown in FIG. 4 and the first embodiment, the total width in the axial direction becomes further small. That is, the total width W1 is smaller than the total width W2, and the total width W2 is smaller than the total width W3. Therefore, the axial length (the total width) of the stator assembly 60 can further be shortened, and shortening and lightening of the whole structure can more effectively be achieved.

Furthermore, all the bearing functions are included in the total width of the one way clutch 30 in the axial direction in this manner, and hence it is possible to eliminate radial bearings which have been disposed on opposite sides of the stator assembly 60 in the axial direction. Therefore, the axial length of the one way clutch 30 can be shortened.

In the above first and second embodiments, the side plate 23, the flange portion 24 and the side plate 26 support the clutch portion 28 of the one way clutch 30 in the axial direction, but in this case, the movement of the bearing members 6 in the axial direction is limited.

The present invention can be used not only in the torque converter but also in a typical power transmission mechanism such as an automatic change gear of a vehicle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-097186, filed Apr. 20, 2010, which is hereby incorporated by reference herein in its entirety.

What is claimed is:

1. A one way clutch comprising:
an outer race including pockets, the outer race having a cam surface and having projecting portions disposed inwardly in a radial direction and extending toward an inner race;
the inner race disposed away from the outer race in an inner diameter direction, relatively rotatably disposed concentrically with the outer race, and having an outer peripheral surface;
torque transmission members arranged in the pockets to transmit a torque between the cam surface of the outer race and the outer peripheral surface of the inner race;
springs for urging the torque transmission members in such a direction that the torque transmission members mesh with the cam surface of the outer race; and
bearing members arranged between the outer race and the inner race and interposed between corresponding projecting portions of the outer race and the outer peripheral surface of the inner race,
wherein a plurality of the projecting portions are arranged at equal intervals in a peripheral direction, and include first projecting portions for holding corresponding springs and second projecting portions for holding corresponding springs and to which the bearing members are attached, and the first projecting portions and the second projecting portions are arranged alternately in the peripheral direction.

2. The one way clutch according to claim 1, wherein the bearing members cover the corresponding second projecting portions.

3. The one way clutch according to claim 1, wherein the bearing members have bearing surfaces on which the corresponding springs are seated.

4. The one way clutch according to claim 1, wherein each of the bearing members is constituted of a pressed steel plate or a sintering material.

5. The one way clutch according to claim 4, wherein the bearing members are covered with a coating material having functionality.

6. A stator assembly including the one way clutch according to claim 1, wherein the outer race of the one way clutch is fixed integrally to a stator wheel of a torque converter.

* * * * *